United States Patent
Kanazawa

[11] Patent Number: 5,805,367
[45] Date of Patent: Sep. 8, 1998

[54] MULTIFUNCTIONAL REARVIEW MIRROR SYSTEM

[75] Inventor: Toru Kanazawa, Shizuoka-ken, Japan

[73] Assignee: Murakami Kaimeido Co., Ltd., Shizuoka-ken, Japan

[21] Appl. No.: 577,746

[22] Filed: Dec. 22, 1995

[30] Foreign Application Priority Data

Jan. 17, 1995 [JP] Japan .................................. 7-020902

[51] Int. Cl.⁶ .............................. G02B 5/10; G02B 5/08; G02F 1/153
[52] U.S. Cl. .......................... 359/868; 359/850; 359/267
[58] Field of Search .................................. 359/267, 268, 359/269, 271, 868, 866, 850

[56] References Cited

U.S. PATENT DOCUMENTS

| | | | |
|---|---|---|---|
| 4,245,894 | 1/1981 | Luchtenberg | 359/866 |
| 4,878,743 | 11/1989 | Aikawa et al. | 359/271 |
| 5,076,674 | 12/1991 | Lynam | 359/274 |
| 5,563,744 | 10/1996 | Matsumiya | 359/855 |

Primary Examiner—David C. Nelms
Assistant Examiner—John P. Cornely
Attorney, Agent, or Firm—Michael J. Striker

[57] ABSTRACT

A transparent electrode 21 formed by the ITO film, an EC layer 22 of an optoelectronic comprising element, a reflecting film also serving an electrode thin film 23 and an insulating sealing film 24 are deposited on a rear surface of a transparent substrate 20 of a main member of a mirror 10. The transparent substrate 20 has dividing lines 15, 16 for dividing a mirror surface area into a main mirror surface area 11 of a certain curvature convex surface having a large radius curvature and a supplemental mirror surface area 12 of a gradually varied curvature convex surface having a gradually decreased radius curvature. The EC layer 22 and the reflecting film also serving the electrode thin film 23 are divided along the dividing line 16 by cutting the transparent electrode 21 so that a reflectivity can be independently controlled on the main mirror surface area 11 and the supplemental mirror surface area 12 to achieve a safe driving of an automobile.

22 Claims, 7 Drawing Sheets

MULTIFUNCTIONAL REARVIEW MIRROR SYSTEM

BACKGROUND OF THE INVENTION

The present invention relates to a rearview mirror for an automobile, especially for a multifunctional rearview mirror having the functions of a wide visibility and an anti-glare function, a light irregularly reflecting function and an indication function together.

It is normally necessary for the rearview mirror to hold a wide backward visibility for overcoming a problem of a visual field fade out area that a view of a passing automobile from the backward which approaches from the automobile side disappears from the rearview mirror view filed and said automobile or the like suddenly appears in a visual field area, and to protect the driver eyes from a headlight glare of the backward automobile in the night time running.

To hold the backward visibility, it is known to use a relatively, large radius of curvature of convex surface mirror, nevertheless, it cannot avoid a problem of the visual field fading out. In the rearview mirror disclosed by U.S. Pat. No. 4,331,382 (as disclosed by a corresponding Japanese Patent Application Publication No. Sho 63-306947, page 3, lines 1 to 9 of the left column), the mirror surface having two areas of different curvatures is used and as shown by a perspective view of FIG. 12, a rearview mirror 50 is composed of a main mirror surface area 51a having a large radius curvature occupying almost mirror surface and a supplemental mirror surface area 51b having a small radius curvature, however, due to the unknown part of the different radius curvature on the mirror surface, the driver has a wring distance sense and causes an accident easily.

Recently a rearview mirror as shown in FIG. 13 was presented by Japanese Patent Application No. Hei 6-18367, in which a rearview mirror 52 is composed of a spherical surface shaped main mirror surface area 52a (convex surface having a certain curvature) and a normal type of an aspherical surface shaped supplemental mirror surface area 52b (having a gradually varied R surface with a gradually enlarged radius curvature) in which a dividing line 53 is provided between above surfaces area by a blasting process to enable the driver a certain visual confirmation to prevent him from a wrong distance sense.

Further for night time running, a reflection variable electrocromic mirror is used. The electrocromic mirror is composed by laminating a transparent substrate, a transparent electrode, an electrocromic (EC) layer, a reflecting film also serving an electrode film, an insulating sealing film and an insulating sealing substrate, in which depending on the condition of the rearward light and an ambient light, a determined voltage is applied to reflect the EC layer, and a transmission of an incident light is adjusted. For an anti-glare condition, the glare rearward light can be prevented by controlling EC layer to down the transmission of the light, however, simultaneously the ambient light is also controlled. Consequently, the visual reaction of the driver to the backward visibility may be decreased.

To overcome the disadvantage described above, a mirror device as shown in FIG. 14 and FIG. 15 is proposed by Japanese Patent Application Publication No. Sho 63-306947 (the corresponding application of British Patent Application No. 87 12801). The mirror device includes a first mirror surface 55 formed of a plurality of mirror surfaces having different curvatures and having a reflecting means for the incident light, a second mirror surface 56 which includes an EC layer 54 provided in front of the surface 55, and a glass made protection plate 57 in front of the second mirror surface 56. The EC layer 54 formed so as to provide controlling from a transparent condition to a reflecting condition, for a normal driving under the glare condition, the EC layer 54 is controlled in a reflecting condition, the incident light 58 is reflected to the inside by the EC layer 54 as shown by FIG. 14. For an anti-glare condition, as shown by FIG. 15, the EC layer 54 is controlled to be a transparent condition and the incident light 59 reaches to the first surface 55 to be reflected to the outside direction.

In using the first surface 55 of the conventional mirror device which is described above, the driver easily causes an accident by a wrong distance sense since a different curvature portion on the first mirror surface is indefinite. The incident light is reflected by the EC layer in front of the second surface 56, however, the transmission of the EC layer can not become 0% so that the images on the first surface and the second surface are doubled with each other and causes a dangerous driving.

SUMMARY OF THE INVENTION

It is an object of the present invention to provide an a rearview mirror having a wide visibility and an anti-glare function and it is an other object of the present invention to provide a multifunctional rearview mirror having an anti glare function, a light irregularly reflecting function and an indication function. It is a further object of the present invention to provide a rearview mirror preventing the driver's eyes from a wrong distance sense which causes a driving accident.

According to one of preferred embodiments of the present invention, the transparent electrode thin film which comprises the reflectivity variable reflecting mirror device is divided on the transparent substrate into a plurality of areas to provide an area boundary line and a part of the area boundary line also serves a dividing line for mirror surface areas respectively having different curvature conditions.

A multifunctional rearview mirror system in accordance with the embodiment of the present invention comprises a transparent substrate provided with a plurality of mirror surface areas having different curvature conditions; a transparent electrode thin film, an optoelectric layer, a light reflecting film also serving as an electrode thin film and an insulating sealing film or an insulating sealing substrate which are orderly deposited on a rear surface of the transparent substrate and dividing lines for dividing only transparent electrode thin film of each layers deposited on the transparent electrode substrate into a plurality of areas; and a certain part in dividing lines also serving as a boundary line of mirror surface areas and an another part forming an anti-boundary line.

The optoelectric layer consists of an electrocromic layer deposited on whole area of the transparent electrode film, or of a combination of an electromic (EC) layer deposited on the main area and an electroluminescence (EL) layer or a transparent ferroelectric film deposited on the supplemental area.

In one of preferred embodiments of the present invention, the transparent substrate includes a main area having a large radius curvature and supplemental area having a gradually decreased radius curvature, the dividing lines are so formed in a reverse T shape to divide the mirror surface into three areas and a vertical line of the reverse T shaped line forms a boundary for dividing the mirror surface area into the main area and the supplemental area. In an other embodiment of the present invention, dividing lines are so formed in a cross shape to divide the mirror surface into four areas and a vertical line of the cross shaped line forms a boundary for dividing the mirror surface area into the main area and the supplemental area. It is preferable that the width of these dividing lines is prepared to be 0.5 mm through 2 mm since the area boundary can not be definite by a width under 0.5 mm, while it is disadvantage that the width of lines over 2 mm may interrupt a rearward sight.

Further a multifunctional rearview mirror system according to the present invention comprises a base, a mirror body having an opening portion opened toward a rearward of an automobile, a reflection variable mirror supported in the mirror body in capable of adjusting an mirror angle and including a plurality of mirror surface areas having different curvature conditions along the mirror longitudinal direction, and a mirror holder supporting a mirror, wherein the reflection variable mirror includes a transparent substrate formed with mirror surface areas having different curvature conditions, a transparent electrode thin film, an optoelectronic layer, a light reflecting film also serving as an electrode thin film and an insulating sealing film or an insulating sealing substrate which are orderly deposited on a rear surface side of the transparent substrate, clip electrodes for applying a certain voltage to a transparent electrode thin film, an electrochemical reactive layer and a light reflective film, and dividing lines for dividing only the transparent electrode thin film of every layers deposited on the transparent substrate or for dividing the transparent electrode thin film a reflectivity variable electrochemical reactive layer a light reflective film also serving as the electrode thin film into a plurality of areas, and a certain part of the dividing lines also serves as a boundary line of different curvature conditioned mirror surface areas and the other part thereof forms an anti-boundary line.

A dividing line formed on the transparent electrode thin film has a different reflectivity from the reflectivity of the surrounding area surface, and is clearly confirmed so that the EC layer, the EL layer or the transparent ferroelectric film layer can be independently provided on every mirror surface area. Further a certain mirror surface area where the driver feels a glare light can be solely controlled in a low reflectivity condition so that the mirror surface area can be adequately selected and controlled in the low reflectivity condition corresponding to driver's individual difference and an traffic condition. In a mirror system which the ferroelectric thin film is deposited on a part of a plurality of areas of the divided transparent electrode, a function of light irregularly reflection plate can be achieved by the scattered incident light in the determined area. The mirror which the EL layer is deposited on a part of the divided transparent electrode area can provide an indicating function necessary for a safety driving rather than the system provided with the EC layer only.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

The one of preferable embodiments of the present invention will be described in accordance with the accompanying drawings.

Figure 1:
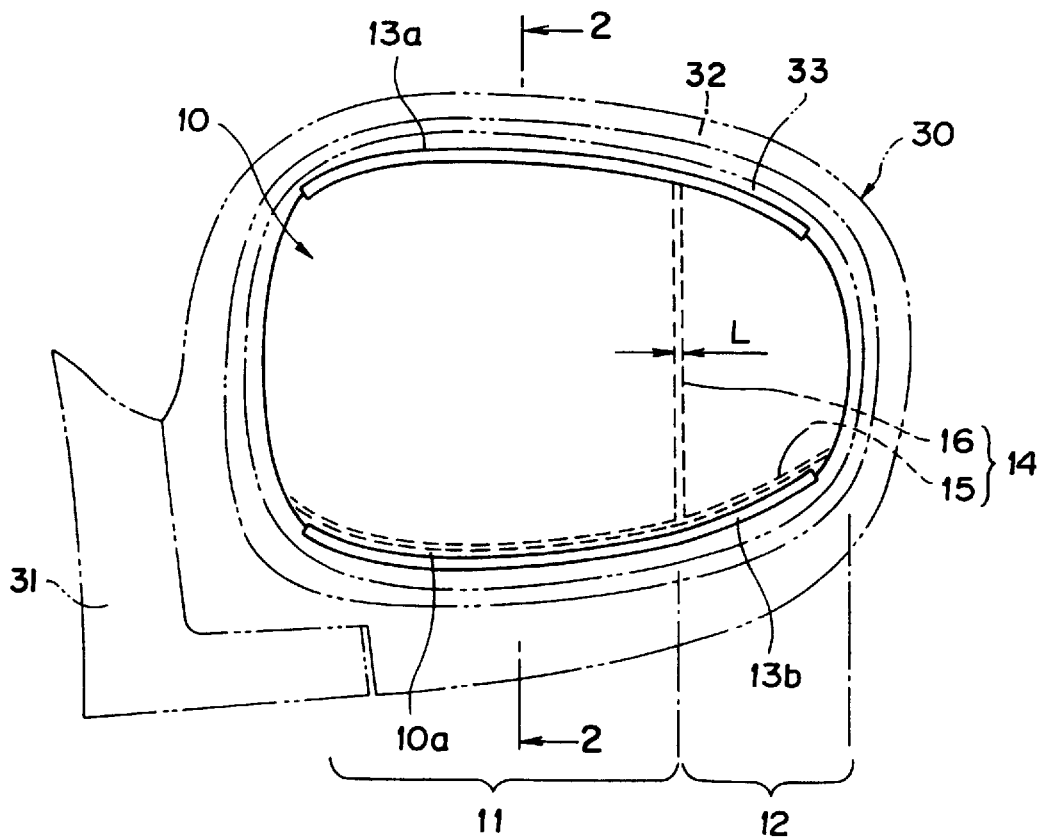
FIG. 1 is a front view of a rearview mirror system according to the preferred embodiment of the present invention.
Figure 2:
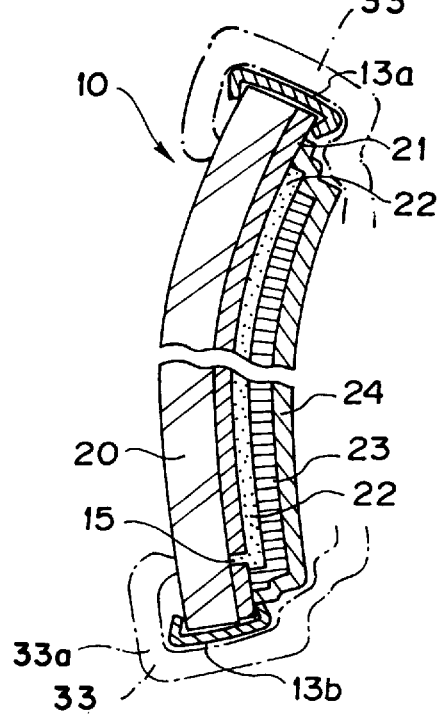
FIG. 2 is an enlarged vertical section view of the rearview mirror taken along the line A—A of FIG. 1.

As shown by FIGS. 1 and 2, in a rearview mirror assembly 30, a mirror body 32 is foldably mounted on a base 31 fixed on an automobile outer body and a mirror holder 33 holding a mirror 10 is mounted in the mirror body 32 in capable of adjusting the mirror reflection angle. The mirror 10 is formed by depositing an electrocromic composing element on a rear surface of a transparent substrate 10 such as a glass and a plastic plate or the like. The transparent substrate 10 includes a main mirror surface area 11 convexly curving in respect of a light incident direction with a certain curvature and a supplemental mirror surface area 12 having an aspherical surface of gradually varied curvature or a convex surface of a gradually varied curvature.

On a rear surface (concave surface) of a transparent substrate 20, a transparent electrode 21 (cathode film) of, for example, a 0.2 $\mu$m thick of ITO (indium tin oxide) film, a 1.5 $\mu$m thick of an oxide (or deoxide) coloring electrocromic (EC) layer 22 such as iridium tin, tantalum pentoxide and tungsten trioxide or the like and a 0.1 $\mu$m thick of a reflection film also serving as an electrode thin film (anode) 23 are orderly deposited by a vacuum depositing or an ion plating method or the like, then 0.1 to 1.0 µm thick of insulating sealing layer 24 such as epoxy resin, silicon nitride ($Si_3N_4$) is coated or deposited.

As shown by FIG. 2 being an enlarged view of the rearview mirror system taken along the line A—A of FIG. 1, clip electrodes 13a, 13b are fixed on an upper and a lower sides of the mirror for applying a voltage to cathode and anode films. Each electrode is connected to the outer electrode (not shown).

A transparent electrode thin film 21 formed on the rear surface of the transparent substrate 20 is divided into three areas by a cutting so that a reverse T shaped dividing line 14 is formed by providing a vertical dividing line 16 upwardly stood from on the way of a horizontal dividing line 15. The width of said dividing line 14 is 0.5 to 2 mm, the vertical dividing line 16 is provided and disposed at a boundary between a main mirror surface area 11 being a convex surface of a certain curvature and a supplemental mirror surface area 12 being a convex surface of gradually varied curvature of the mirror surface 10, and both horizontal dividing line 15 and an area 10a under the horizontal dividing line are covered by a lower periphery 33a of the mirror holer 33 as shown in FIGS. 1 and 2. The dividing line portion formed by the cutting, as shown by FIG. 2, is filled with a part of the EC layer 22 on the transparent electrode thin film.

By using the EC mirror described above, a predetermined transmission can be obtained in accordance with the applied voltage condition to the EC layer of the main mirror surface area 11 and the supplemental mirror surface area 12. Then the reflectivity at the mirror dividing line 14 part is not varied and as a result of cutting the ITO layer, the reflectivity is different from the reflectivitiy of the surrounding surface, the boundary of the main mirror surface area 11 and the supplemental mirror surface area 12 is clearly confirmed by eyes to prevent the driver from a wrong distance sense. The horizontal dividing line 15 and an area 10a under the line 15 is hidden from the outside by an lower periphery 33a of the mirror holder 33 (FIGS. 1 and 2)

Figure 3:
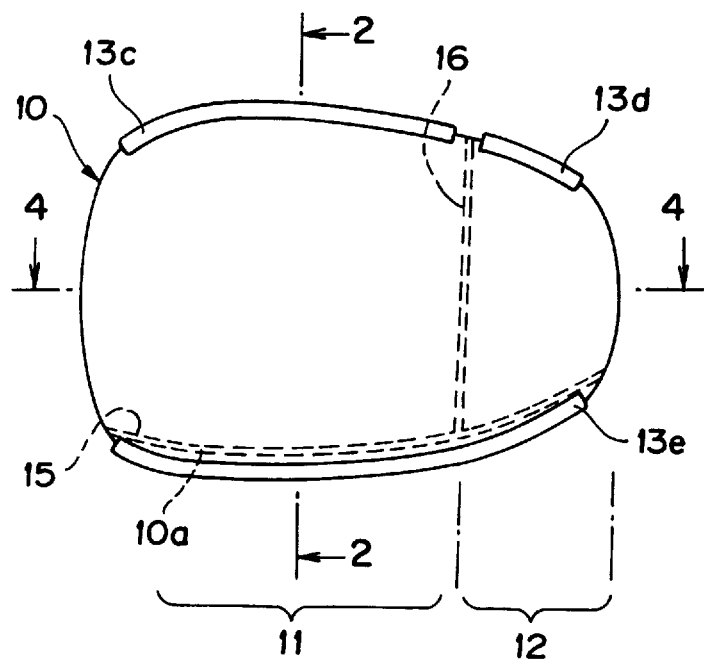
FIG. 3 is a front view of the rearview mirror system according to the preferred embodiment of the present invention in which the EC layer is formed on the main mirror surface area and the supplemental mirror surface area to enable of controlling the reflectivity of each area separately and the mirror body and the mirror holder are not shown.

FIG. 3 shows a rearview mirror system in capable of controlling a reflectivity individually on the main mirror surface area 11 and on the supplemental mirror surface area 12.

Figure 4:
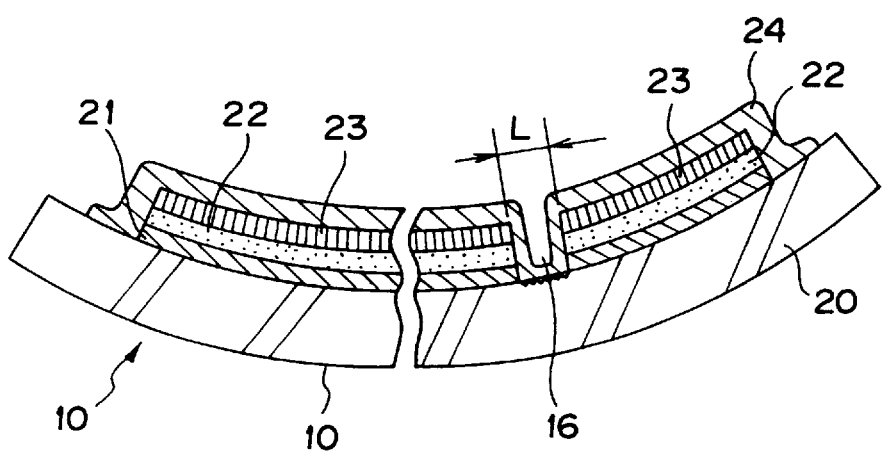
FIG. 4 is an enlarged cross section view of the rearview mirror system taken along the line B—B of FIG. 3.

In the mirror 10, same as the mirror described hereinbefore, the transparent electrode (cathode film) 21 on the rear surface (concave surface) of the transparent substrate 20 is divided into three areas by cutting and the vertical dividing line 16 is disposed to locate at the boundary between the main mirror surface area 11 and the supplemental mirror surface area 12. After masking the dividing lines 15, 16, an electrocromic (EC) layers 22, 22 and reflective layers also serving electrode thin films (anode) 23, 23 are respectively deposited on divided areas 11, 12, then the masking is removed and an insulating sealing layer 24 is coated or deposited over the films 23, 23 and the line width of the dividing lines 15, 16 (FIG. 4).

The clip electrode 13c and the clip electrode 13d are shaped and fixed on upper portions of the main mirror surface area 11 and of the supplemental mirror surface area 12, respectively, and a common clip electrode 13e is shaped and fixed on a lower portion of the main and supplement area (FIG. 3). Same as the embodiment described hereinbefore, the vertical dividing line 16 of the reverse T shaped dividing line 14 is provided to locate at the boundary between the main mirror surface area 11 being the a certain curvature convex surface and the supplemental mirror surface area 12 being gradually varied curvature convex surface of the mirror surface 10 and the horizontal dividing line 15 is formed at the position of which height is covered by the lower periphery 33a of the mirror holder 33 as shown in FIGS. 1 and 2.

In the EC mirror described above, depending on the voltage applying condition to the EC layer of the main mirror surface area 11 and the supplemental mirror surface area 12, respective different transmissions are indicated so as to control EC function on every mirror surface areas independently. Then a reflectivity on apart of the mirror dividing line 14 is not varied and as a result of cutting the ITO layer, due to a different reflectivity from the reflectivity of the surrounding surface, the boundary of the mirror surface area 11 and the supplemental mirror surface area 12 is clearly confirmed by eyes so as to prevent the driver's eyes from a wrong distance sense. The horizontal dividing line 15 is also covered from the outside by the lower periphery 33a of the mirror holder 33 as shown in FIGS. 1 and 2 in a case described above.

Figure 5:
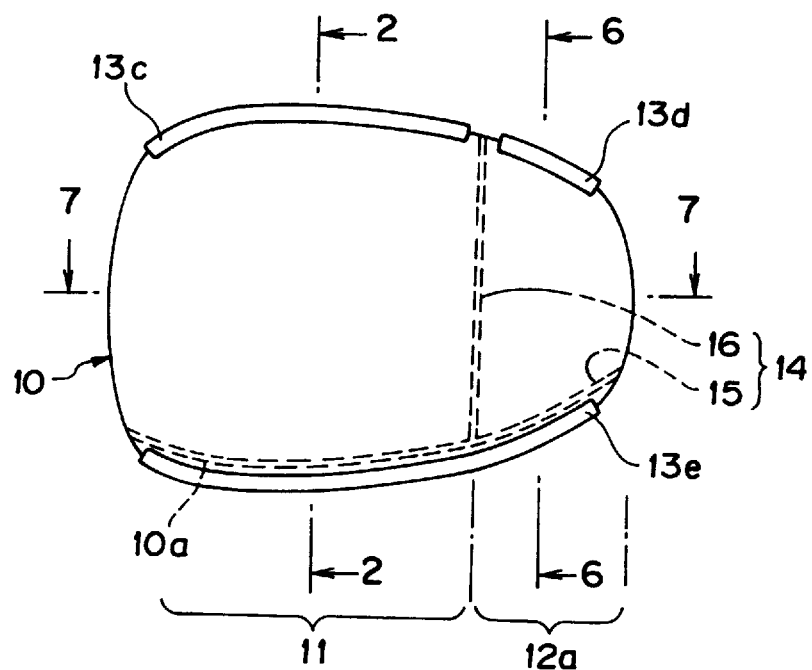
FIG. 5 is a front view of the rearview mirror system according to the preferred embodiment of the present invention in which the EC layer is formed on both the main mirror surface area and the supplemental mirror surface area and the transparent ferroelectric thin film is formed on the supplemental mirror surface area.

FIG. 5 is a front view showing an embodiment of the rearview mirror of the present invention including a transparent ferroelectric thin film deposited on the supplemental mirror surface area. In the embodiment, the anti-glare function is achieved on the main mirror surface area 11 and the light irregularly reflecting function is achieved on the supplemental mirror surface area 12a.

Figure 7:
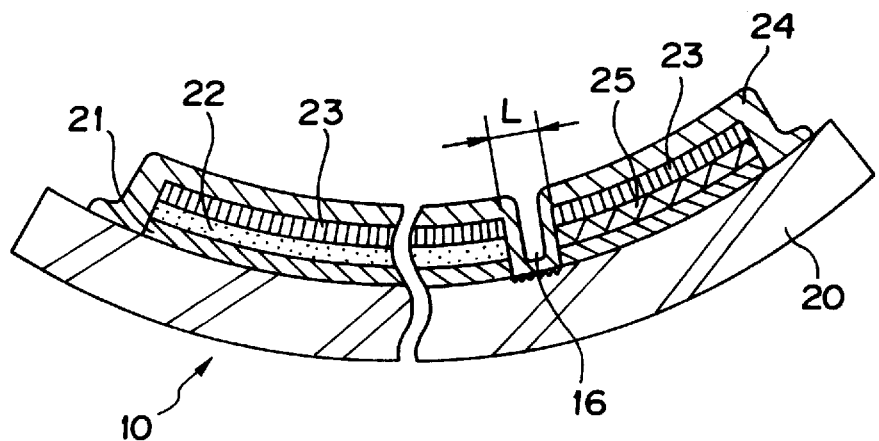
FIG. 7 is an enlarged cross section view of the rearview mirror system taken along the line D—D of FIG. 5.

Same as the embodiment described hereinbefore, in the mirror 10, the transparent electrode (cathode) 21 formed by the ITO film is so deposited that the vertical dividing line 16 of the reverse T shaped dividing line 14 is located at the boundary between the main mirror surface area 11 and the supplemental mirror surface area 12. After masking the dividing lines 15, 16, the EC layer 22 and a transparent ferroelectric thin film 25 such as PZT ($PbZr1-XTixO_3$), $PbTiO_3$ are formed on the divided main mirror surface area 11 and on the supplemental mirror surface area 12, respectively. The reflection film also serving the electrode thin film (anode) 23, 23 are orderly deposited on the EC layer 22 and on the transparent ferroelectric thin film 25 respectively by a vacuum depositing and a ionic plating method or the like, the masking over the width of the dividing lines is removed and then insulating sealing layer 24 is coated and deposited over the films 23, 23 and the width of dividing lines 15, 16 (as shown by FIG. 7).

Figure 6:
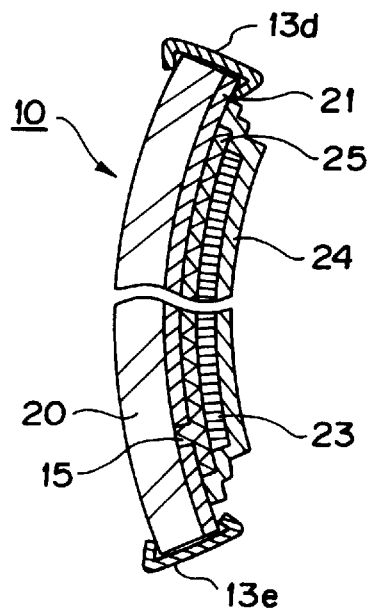
FIG. 6 is an enlarged vertical section view of the rearview mirror system taken along the line C—C of FIG. 5.

The clip electrode 13c and the clip electrode 13d are fixed on upper portions of the main mirror surface area 11 and the supplemental mirror surface area 12 respectively and the common clip electrode 13e is fixed on the lower portion of both main and supplemental mirror surface areas (FIG. 5 and FIG. 6). Same as the embodiment described hereinbefore, the vertical dividing line 16 is provided to locate at the boundary between the main mirror surface area 11 and the supplemental mirror surface area 12 of the mirror surface 10 and the horizontal dividing line 15 is formed at the position of which height is covered by the lower periphery 33a of the mirror holder 33 as shown in FIGS. 1 and 2.

In the EC mirror described above, in accordance with the voltage applying condition to the EC layer 22 and to the transparent ferroelectric thin film 25, EC function is achieved on the main mirror surface area 11 side, the light irregularly reflecting effect is achieved on the supplemental mirror surface area 12 side by applying the voltage to the transparent ferroelectric thin film 25. Also in this embodiment, the reflectivity is not varied at the part of the mirror dividing line 14 and the boundary of the main mirror surface 11 and the supplemental mirror surface area 12 is clearly confirmed by eyes to prevent the driver's eyes from the wrong distance sense. The cross section taken along the A—A line of FIG. 5 is the same as the one shown by FIG. 2.

Figure 8:
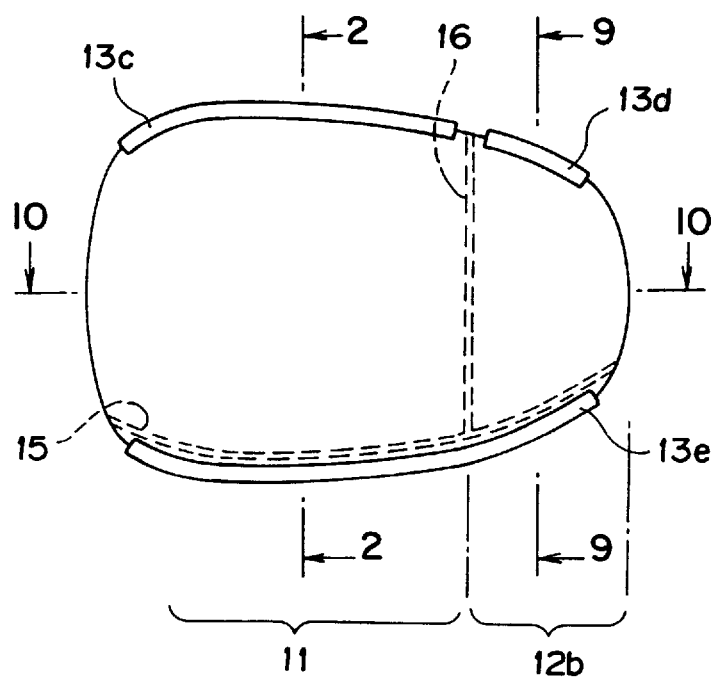
FIG. 8 a front view of the rearview mirror system according to the preferred embodiment of the present invention in which the EC layer is formed on the main mirror surface area and the supplemental mirror surface area and the electroluminescence layer is formed on the supplemental mirror surface area
Figure 9:
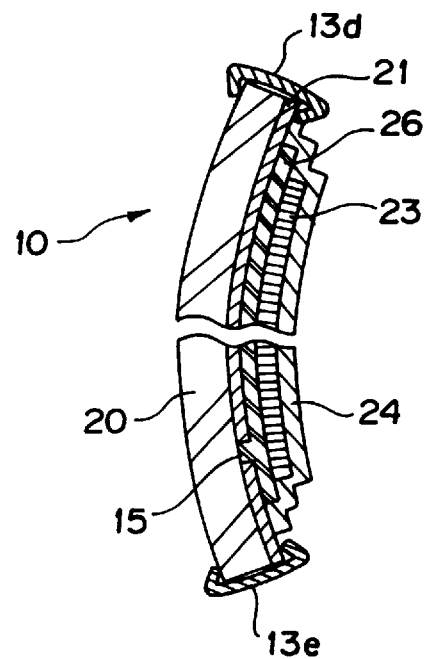
FIG. 9 is an enlarged vertical section view of the rearview mirror system taken along the line E—E of FIG. 8.

FIG. 8 is a front view of the embodiment of the rearview mirror of the present invention in which the electroluminescence (EL) layer is formed on the supplemental mirror surface area. In the embodiment, the anti-glare function and the indication function are respectively achieved on the main mirror surface area and the supplemental mirror surface area 12. In the mirror 10, the transparent electrode (cathode film) 21 formed by ITO film is so provided that the vertical dividing line 16 of the reverse T shaped dividing line 14 is located at the boundary between the main mirror surface area 11 and the supplemental mirror surface area 12b. After masking the dividing lines 15, 16, the EC layer 22 and the EL layer 26 are respectively formed on the main mirror surface area 11 and on the supplemental mirror surface area 12b which are divided.

FIG. 8 is a front view of the embodiment of the rearview mirror of the present invention in which the electroluminescence (EL) layer is formed on the supplemental mirror surface area. In the embodiment, the anti-glare function and the indication function are respectively achieved on the main mirror surface area and the supplemental mirror surface area 12. In the mirror 10, the transparent electrode (cathode film) 21 formed by ITO film is so provided that the vertical dividing line 16 of the reverse T shaped dividing line 14 is located at the boundary between the main mirror surface area 11 and the supplemental mirror surface area 12b. After masking the dividing lines 15, 16, the EC layer 22 and the EL layer 26 are respectively formed on the main mirror surface area 11 and on the supplemental mirror surface area 12b which are divided.

Figure 10:
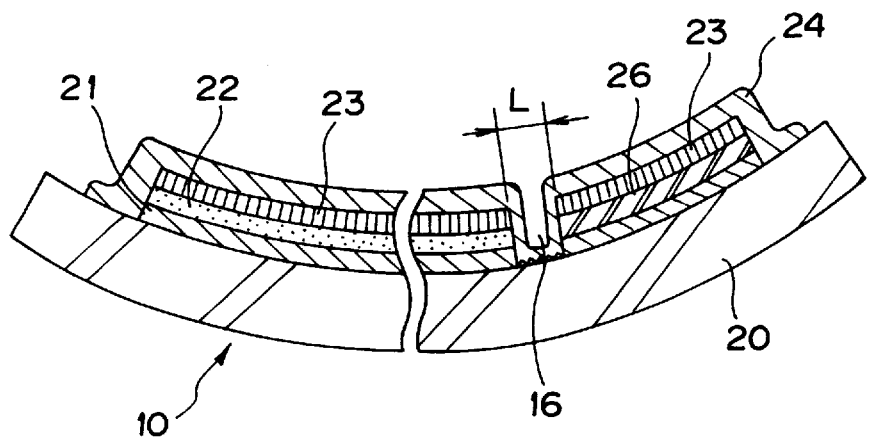
FIG. 10 is an enlarged cross section view of the rearview mirror system taken along the line F—F of FIG. 8.

Further the reflecting film also serving as the electrode film (anode 23, 23 are deposited on the EC layer 22 and on the EL layer 26 respectively by a vacuum depositing and the ionic plating method or the like, thereafter the masking over the width of the dividing lines is released and the insulating sealing layer 24 is coated or deposited over the films 23, 23 and the width of both dividing lines 15,16 (FIG. 10). Same as the embodiment described hereinbefore, the clip electrode 13c, 13d and 13e are used and the vertical dividing line 16 of the reverse T shape dividing line 14 is so provided to locate at the boundary between the main mirror surface area 11 being a certain curvature convex surface and the supplemental mirror surface area 12 being a gradually varied curvature of convex surface of the mirror surface 10.

In the EC mirror described above, the voltage is applied to the EC layer of the main mirror surface area 11 to achieve the EC function and the voltage is applied to the mirror surface area 12b to be luminant and achieve an indication function is achieved so that EC functions are achieved on every mirror surface areas independently. In a case described above, the reflectivity is not varied at the parts of the mirror dividing lines 15, 16 either, and the boundary of the main mirror surface area 11 and the supplemental mirror surface area 12 is confirmed clearly by eyes to prevent the driver's eyes from the wrong distance sense. When said EL layer is not transparent against to the visible radiation, it may be possible to use the mirror surface side of the transparent electrode as the reflecting surface. Further the cross section taken along the line of A—A is same as the one shown by FIG. 2 of the embodiment 1.

Figure 11:
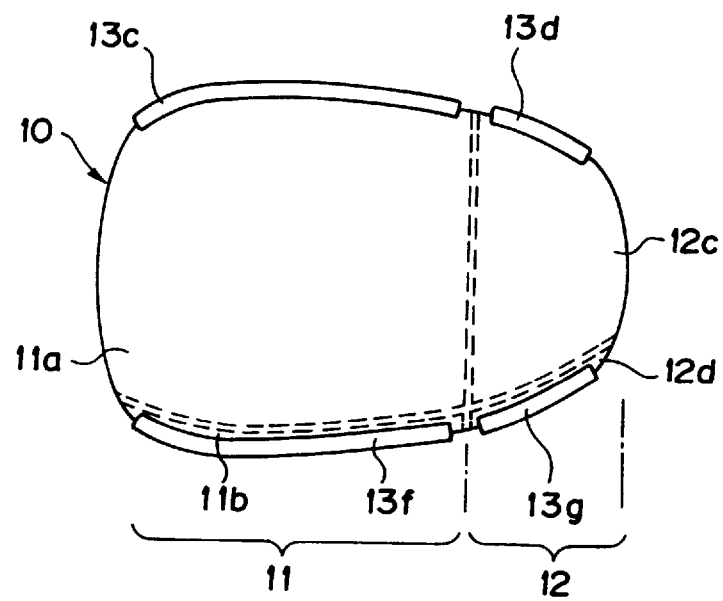
FIG. 11 is a front view showing the example of the rearview mirror system in which the mirror surface is divided into four areas.
Figure 12:
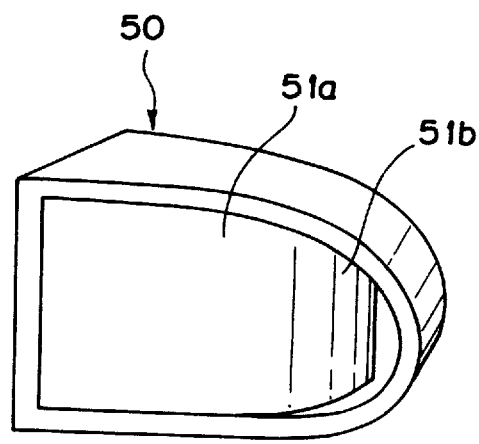
FIG. 12 is a perspective view of the conventional rearview mirror system having a different radius curvature.
Figure 13:
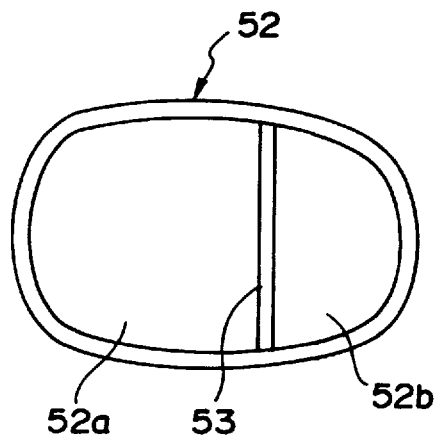
FIG. 13 is a front view of the other conventional rearview mirror system.
Figure 14:
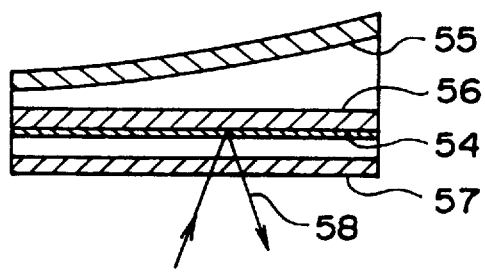
FIG. 14 is a section view showing a glare condition in further another conventional rearview mirror system.
Figure 15:
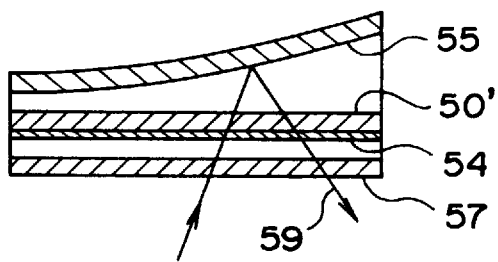
FIG. 15 is a section view showing the anti-glare condition of the rearview mirror system of FIG. 14.

FIG. 11 shows further embodiment of the present invention, the transparent electrode thin film is divided into four areas 11a, 11b, 12c and 12d by providing a cross shaped dividing line 14 and are separately connected to the outside by clip electrodes 13c, 13d, 13f and 13g. The EC layer is deposited on both areas 11a and 11b, the transparent ferroelectric thin film layer or the EL layer is deposited on both areas 12c and 12d so that the multifunctional rearview mirror having the EC function and the light scattering function or the indication function can be achieved.

In accordance with the embodiments of the present invention, when the EC mirror is manufactured, the dividing line is marked by cutting the transparent electrode thin film as conventionally practiced, and the working effect can be progressed. The width of the dividing line is so formed in 0.5 to 2 mm that the driver can confirm the mirror by eyes easily, it is useful for preventing the driver's eyes from a wrong confirmation and the rearward visibility is not interrupted to achieve a safe driving. The reflectivity on the EC layer can be independently controlled at every mirror surface areas, and the reflectivity on the glare mirror surface area is decreased and the anti-glare effect of the rearview mirror is achieved so that whole mirror surface is prevented from becoming dark to progress the safe driving. Further the mirror surface area where is not usually used can be controlled in a low reflectivity condition, and the rearview mirror can be applied for an individual difference for a traffic condition. The luminous effect by the EL layer can be utilized as the indication function such as a directional signal or a side marker lamp.

It is further understood by those skilled in the art that the foregoing description is a preferred embodiment of the disclosed device and various change and modifications may be made in the invention without departing from the spirit and scope thereof.

We claim:

1. A multifunctional rearview mirror system, comprising a transparent substrate having a main mirror surface area being a convex surface of a certain curvature and a supplemental mirror surface area being a convex surface of a gradually varied curvature; and a transparent electrode thin film, an optoelectronic layer, a light reflecting film also serving as an electrode thin film, and, an insulating sealing element deposited in that order on a rear surface side of said transparent substrate; wherein dividing lines are formed in said transparent electrode thin film so that one part of said dividing lines serves as a boundary line between said main mirror surface area and said supplemental mirror surface area and another part forms a non-boundary line; such that the insulating sealing element is directly deposited in said one part of said dividing lines serving as the boundary line and only the optoelectronic layer is filled in the non-boundary line.

2. A multifunctional rearview mirror system as defined in claim 1, wherein said insulating sealing element is formed as an insulating sealing film.

3. A multifunctional rearview mirror system as defined in claim 2, wherein said insulating sealing element is an insulating sealing substrate.

4. A multifunctional rearview mirror system as defined in claim 1, wherein said optoelectronic layer is an electrochromic layer deposited on a rear surface area of the transparent electrode thin film that corresponds to both the main mirror surface area and the supplemental mirror surface area.

5. A multifunctional rearview mirror system, comprising a transparent substrate having a main mirror surface area being a convex surface of a certain curvature and a supplemental mirror surface area being a convex surface of a gradually varied curvature; and a transparent electrode thin film, an electrochromic layer, a light reflecting film serving as an electrode thin film, and, an insulating sealing element deposited in that order on a rear surface side of said transparent substrate being said main mirror surface area; a transparent electrode thin film, an electroluminescent layer, a light reflecting film also serving as an electrode thin film, and, an insulating sealing element, deposited in that order on a rear surface side of said transparent substrate being said supplemental mirror surface area; wherein dividing lines are formed in said transparent electrode thin film so that one part of said dividing lines serves as a boundary line between said main mirror surface area and said supplemental mirror surface area and another part forms a non-boundary line; such that the insulating sealing element is directly deposited in said one part of said dividing lines serving as the boundary line and only the electrochromic layer is filled in the non-boundary line.

6. A multifunctional rearview mirror system as defined in claim 1, wherein said optoelectronic layer includes an electrochromic layer formed in an area corresponding to said main mirror surface area and a transparent ferroelectric thin film layer formed in an area corresponding to said supplemental mirror surface area.

7. A multifunctional rearview mirror system as defined in claim 1, wherein said dividing lines are formed in an upside down T-shape so as to divide a mirror surface into three areas so that a vertical line of the upside down T-shape forms a boundary where said main area and said supplemental area are divided.

8. A multifunctional rearview mirror system as defined in claim 1, wherein said dividing lines are formed in a cross-shape so as to divide a mirror surface into four areas so that a vertical line of said cross-shape forms a boundary where said main area and said supplemental area are divided.

9. A multifunctional rearview mirror system as defined in claim 1, wherein said dividing lines have a width substantially equal to between 0.5 mm and 2 mm.

10. A multifunctional rearview mirror system, comprising a mirror body having an opening portion openable toward a rear of an automobile; a reflection variable mirror supported in said mirror body and including a plurality of mirror surface areas with different curvature conditions along a mirror longitudinal direction and having a rear surface side; and a mirror holder supporting said mirror body, said reflection variable mirror including a transparent substrate formed with said mirror surface areas with different curvature conditions; and a transparent electrode thin film, an optoelectronic layer, a light reflecting film serving as an electrode thin film and an insulating sealing element orderly deposited on said rear surface side of said transparent substrate in that order, clip electrodes for applying a certain voltage to said transparent electrode film, an layer and a light reflective film serving as an electrode thin film, wherein dividing lines are formed for dividing said transparent electrode thin film deposited on said transparent substrate into a plurality of areas, wherein said mirror surface areas of said transparent substrate including a main mirror surface area being a convex surface of a certain curvature and a supplemental mirror surface area being a convex surface of a gradually varied curvature of which radius of curvature being gradually decreased, one part of said dividing lines serving as a boundary line of said mirror areas having different curvature conditions and another part forming a non line; such that the insulating sealing element is directly deposited in said one part of said dividing lines serving as the boundary line and only the optoelectronic layer is filled in the non-boundary line.

11. A multifunctional rearview mirror system as defined in claim 10, wherein said insulating sealing element is an insulating sealing film.

12. A multifunctional rearview mirror system as defined in claim 10, wherein said insulating sealing element is an insulating sealing substrate.

13. A multifunctional rearview mirror system as defined in claim 10, wherein said optoelectronic layer is an electrochromic layer deposited on a rear surface side of said transparent electrode thin film.

14. A multifunctional rearview mirror system as defined in claim 10, wherein said optoelectronic layer includes an electrochromic layer deposited on said transparent electrode thin film in an area corresponding to said mirror surface area and a transparent ferroelectric thin film layer deposited on said transparent electrode thin film in an area corresponding to said supplemental mirror surface area.

15. A multifunctional rearview mirror system as defined in claim 10, wherein said dividing lines have a width substantially corresponding to between 0.5 mm and 2 mm.

16. A multifunctional rearview mirror system, comprising a mirror body having an opening portion openable toward a rear of an automobile; a reflection variable mirror supported in said mirror body and including a plurality of mirror surface areas with different curvature conditions along a mirror longitudinal direction and having a rear surface side; and a mirror holder supporting said mirror body; wherein said reflection variable mirror comprises a transparent substrate with said mirror surface areas having a main mirror surface area being a convex surface of a certain curvature and a supplemental mirror surface area being a convex surface of a gradually varied curvature with a gradually decreasing radius of curvature; and a transparent electrode thin film, an electronic layer, a light reflecting film serving as an electrode thin film and an insulating sealing element orderly deposited in that order on a rear surface side of said transparent substrate being said main mirror surface area; another transparent electrode thin film, an electroluminescent layer, a light reflecting film also serving as an electrode thin film and an insulating sealing element orderly deposited in that order on a rear surface side of said transparent substrate being said supplemental mirror surface area; clip electrodes for applying a certain voltage to a reactive layer and a light reflective film serving as an electrode thin film; wherein dividing lines are formed on said transparent electrode thin film so that one part of said dividing lines also serves as a boundary line between said main mirror surface area and said supplemental mirror surface area and another part forms a non-boundary line; such that the insulating sealing element is directly deposited in one part of said dividing lines serving as the boundary line and only the optoelectronic layer is filled in the non-boundary line.

17. A multifunctional rearview mirror system comprising a mirror body and having an opening portion openable toward a rear of an automobile; a reflection variable mirror supported in said mirror body and including a plurality of mirror surface areas with different curvature conditions along a mirror longitudinal direction and having a rear surface side; and a mirror holder supporting said mirror body; said reflection variable mirror including a transparent substrate formed with said mirror surface areas with different curvature conditions; and a transparent electrode thin film, an optoelectronic layer, a light reflecting film serving as an electrode thin film, and, an insulating sealing element, orderly deposited in that order on said rear surface side of said transparent substrate, clip electrodes for applying a certain voltage to said transparent electrode film, an electrochemical reactive layer and a light reflective film serving as an electrode thin film, wherein dividing lines are formed for dividing said transparent electrode thin film deposited on said transparent substrate into a plurality of areas, said transparent substrate including a main mirror surface area being a convex surface of a certain curvature and a supplemental mirror surface area being a convex surface of a gradually varied curvature with a gradually decreasing radius of curvature, one part of said dividing lines serving as a boundary line between said main mirror surface area and said supplemental mirror surface area and another part forming a non-boundary line; and wherein the insulating sealing element is directly deposited in said one part of said dividing lines serving as the boundary line and only the optoelectric layer is filled in the non-boundary, line and wherein said dividing lines are formed as an upside down T-shape to divide a mirror surface into three areas so that a vertical line of said upside down T-shape forms a boundary of said main mirror surface area and said mirror surface supplemental area, and a horizontal line of said upside down T-shape is covered by a lower periphery of said mirror holder to prevent from appearing outwardly.

18. A multifunctional rearview mirror system as defined in claim 17, wherein the optoelectronic layer and the light reflecting film serving as the electrode thin film are not laminated on said vertical line while the insulating sealing element or the insulating sealing substrate is directly deposited thereon, wherein the optoelectronic layer, the light reflecting film serving as the electrode thin film and the insulating sealing element or the insulating sealing substrate are deposited on the horizontal line.

19. A multifunctional rearview mirror system as defined in claim 17, wherein the optoelectronic layer is an electrochromic layer deposited on the main mirror surface area and the supplemental mirror surface area divided by the vertical line and on the horizontal line.

20. A multifunctional rearview mirror system comprising a mirror body having an opening portion openable toward a rear of an automobile; a reflection variable mirror supported in said mirror body and including a plurality of mirror surface areas with different curvature conditions along a mirror longitudinal direction and having a rear surface side; and a mirror holder supporting said mirror body; said reflection variable mirror including a transparent substrate formed with said mirror surface areas with different curvature conditions; and a transparent electrode thin film, an optoelectronic layer, a light reflecting film serving as an electrode thin film, and, an insulating sealing element orderly deposited in that order on said rear surface side of said transparent substrate, clip electrodes for applying a certain voltage to said transparent electrode thin film, an electrochemical reactive layer and a light reflective film serving as an electrode thin film, wherein dividing lines are formed for dividing said transparent electrode thin film deposited on said transparent substrate into a plurality of areas, wherein said transparent substrate includes a main mirror surface area being a convex surface, of certain curvature and a supplemental mirror surface area being a convex surface of a gradually varied curvature with a gradually decreasing radius of curvature, one part of said dividing lines serving as a boundary line between said main mirror surface area and said supplemental mirror surface and another part forming a non-boundary line; and wherein the insulating sealing element is directly deposited on said dividing lines serving as the boundary line and only the optoelectronic layer is filled in the non-boundary line; and wherein said dividing lines are formed in a cross shape so as to divide a mirror surface into four areas, said cross-shape having a vertical which forms a boundary wherein said main mirror-surface area and said supplemental mirror surface area, and also a horizontal line and a vertical line portion under a cross point with said horizontal line which are covered by a lower periphery of said mirror holder for preventing from appearing outwardly.

21. A multifunctional rearview mirror system as defined in claim 20, the supplemental mirror surface area and the optoelectronic layer and the light reflecting film serving as the electrode thin film are not deposited on the vertical line while the insulating sealing element or the insulating sealing substrate is directly deposited on the vertical line, the light reflecting film serving as the electrode thin film and the insulating sealing element or the insulating sealing substrate are deposited on the non-boundary line.

22. A multifunctional rearview mirror system as defined in claim 20, wherein the optoelectronic layer is electrochromic layer deposited on the main surface area and the supplemental mirror surface area divided by the vertical line of the cross shape and on the horizontal line of the cross shape.

* * * * *